US012078067B2

(12) United States Patent
Di Sisto et al.

(10) Patent No.: US 12,078,067 B2
(45) Date of Patent: Sep. 3, 2024

(54) TURBINE AND BLADE FOR THE PROTECTION OF THE ROOT FROM FLOW PATH HOT GASES

(71) Applicant: NUOVO PIGNONE TECNOLOGIE—SRL, Florence (IT)

(72) Inventors: Paolo Di Sisto, Florence (IT); Leonardo Tognarelli, Florence (IT); Simone Cubeda, Florence (IT)

(73) Assignee: Nuovo Pignone Tecnologie—SRL, Florence (IT)

( * ) Notice: Subject to any disclaimer, the term of this patent is extended or adjusted under 35 U.S.C. 154(b) by 0 days.

(21) Appl. No.: 17/905,297

(22) PCT Filed: Feb. 22, 2021

(86) PCT No.: PCT/EP2021/025073

§ 371 (c)(1),
(2) Date: Aug. 30, 2022

(87) PCT Pub. No.: WO2021/175488

PCT Pub. Date: Sep. 10, 2021

(65) Prior Publication Data

US 2023/0082038 A1 Mar. 16, 2023

(30) Foreign Application Priority Data

Mar. 4, 2020 (IT) ........................ 102020000004585

(51) Int. Cl.

| | |
|---|---|
| ***F01D 11/00*** | (2006.01) |
| ***F01D 5/08*** | (2006.01) |
| ***F01D 11/04*** | (2006.01) |

(52) U.S. Cl.

CPC ............ *F01D 11/001* (2013.01); *F01D 5/081* (2013.01); *F01D 11/00* (2013.01); *F01D 11/04* (2013.01);

(Continued)

(58) Field of Classification Search

CPC ......... F01D 11/001; F01D 5/081; F01D 11/04
See application file for complete search history.

(56) References Cited

U.S. PATENT DOCUMENTS 893,077 A * 7/1908 Karper .................. F01D 5/3038 416/215
3,043,562 A * 7/1962 Fusner .................. F01D 5/3015 416/193 A (Continued)

FOREIGN PATENT DOCUMENTS

EP 2208860 A2 7/2010
EP 2402561 A2 1/2012

(Continued)

*Primary Examiner* — Sizo B Vilakazi
*Assistant Examiner* — Susan E Scharpf
(74) *Attorney, Agent, or Firm* — Paul Frank + Collins P.C.

(57) ABSTRACT

A turbine, and particularly a low pressure turbine is disclosed, which comprises a plurality of rotor members and spacers for arranged between rotor members, to avoid that an ingested gas flow from the hot gas flow path channel reaches the wheel space. The rotor members each include a deflector. The deflector is placed in correspondence with each spacer and deflects the ingested gas flow over the upper surface of the spacer, thus preventing it to heat up the roots of the blades.

18 Claims, 4 Drawing Sheets

(52) U.S. Cl.
CPC ...... *F05D 2220/32* (2013.01); *F05D 2240/24* (2013.01); *F05D 2240/55* (2013.01)

(56) References Cited

U.S. PATENT DOCUMENTS

| | | | | | |
|---|---|---|---|---|---|
| 3,294,364 | A * | 12/1966 | Stanley | F01D 5/3007 416/210 A |
| 4,199,131 | A | 4/1980 | Boski et al. | |
| 4,744,386 | A | 5/1988 | Frazer | |
| 5,281,097 | A * | 1/1994 | Wilson | F01D 5/22 416/193 A |
| 5,535,828 | A | 7/1996 | Kinderen et al. | |
| 5,749,706 | A * | 5/1998 | Maar | F01D 5/323 29/512 |
| 5,833,244 | A | 11/1998 | Salt et al. | |
| 8,141,641 | B2 | 3/2012 | Chan | |
| 8,794,260 | B2 | 8/2014 | Faillat et al. | |
| 11,248,485 | B1 | 2/2022 | Baldiga et al. | |
| 2007/0089545 | A1 | 4/2007 | Roney, Jr. et al. | |
| 2009/0142195 | A1* | 6/2009 | Brittingham | F01D 5/3007 416/223 A |
| 2010/0178160 | A1* | 7/2010 | Liotta | F01D 11/006 415/173.7 |
| 2010/0254806 | A1 | 10/2010 | Deodhar et al. | |
| 2012/0003079 | A1* | 1/2012 | Farrell | F01D 11/005 415/173.6 |
| 2013/0058756 | A1* | 3/2013 | Tham | F01D 11/001 415/199.2 |
| 2014/0037435 | A1* | 2/2014 | Porter | F01D 11/04 415/173.7 |
| 2015/0184529 | A1 | 7/2015 | Zheng et al. | |
| 2016/0186664 | A1 | 6/2016 | Kirtley et al. | |
| 2017/0022818 | A1 | 1/2017 | Weinert et al. | |
| 2017/0023023 | A1* | 1/2017 | Hiernaux | F04D 29/682 |
| 2017/0183974 | A1 | 6/2017 | McDufford | |
| 2017/0326757 | A1 | 11/2017 | Marin et al. | |
| 2018/0100396 | A1 | 4/2018 | Lipkin et al. | |
| 2019/0284946 | A1* | 9/2019 | Berdowski | F01D 11/20 |
| 2020/0056486 | A1 | 2/2020 | Schrape et al. | |
| 2023/0358146 | A1* | 11/2023 | Dl Sisto | F01D 5/081 |

FOREIGN PATENT DOCUMENTS

| | | | |
|---|---|---|---|
| EP | 3203023 | A1 | 8/2017 |
| EP | 3540180 | A1 | 9/2019 |

* cited by examiner

TURBINE AND BLADE FOR THE PROTECTION OF THE ROOT FROM FLOW PATH HOT GASES

TECHNICAL FIELD

The present disclosure concerns a gas turbine, which is capable of protecting the rim of the wheels of the rotor assemblies from ingestion the hot gases into the wheel spaces while operating.

BACKGROUND ART

As is well known, a gas turbine is an energy conversion plant, which usually comprises, among other things, a compressor, to draw in and compress a gas, a combustor (or burner) to add fuel to heat the compressed air, a high pressure turbine, comprising a plurality of rotor assemblies, to extract power from the hot gas flow path and drive the compressor and a low pressure turbine, also comprising a plurality of rotor assemblies, mechanically connected to a load.

In low pressure turbines design in particular, precautions are usually taken to reduce the gas ingestion from the hot gas flow path, which may have detrimental impact on not hot gas components as wheels and spacers. The phenomenon of the gas ingestion from the hot gas flow path may occur when engine operates at partial load and/or when engine parts have been manufactured not fully conform to design requirements and/or when some parts (e.g. seals, purging pipes) have been damaged or worn during operation.

More specifically, a typical low pressure turbine comprises, as mentioned above, a plurality of rotor members, each having a rotor wheel with a rim, on which a plurality of blades is coupled.

Each blade comprises a male-shaped dovetail or root, designed to fit with one corresponding groove obtained on the rim of the rotor wheel. The wheels are usually made of a less noble material than the blades.

Between two adjacent, facing rotor wheels, a wheel space is individuated between two rotor wheels of two rotor members.

The phenomenon of the gas ingestion from the hot gas flow path usually occurs when part of the hot gas flows into the wheel space, thus causing wheel rims to operate above or close to their material temperature limits, which, being made of non-noble material, can get damaged, reducing the useful life of the wheels. It implies that this phenomenon might be the cause of wheel dovetail failure (e.g. large deformation) and subsequently release of blades.

In addition to the above, the wheel spaces are usually cooled. To this end, the gas turbines are equipped with a piping system to provide purging air coming from the compressor to low pressure turbine. In particular, the purging air is introduced into the wheel spaces of the low pressure turbines. In part this reduces the overall temperature of the wheel spaces.

The hot gas ingestion is normally prevented when the amount of purging air is equal or more than the amount of air pumped up by the wheels. If less, than pump effect will compensate what not provided by the purging system with hot gas air that will sucked in far from the wheel and pumped out near the wheel (recirculation). The recirculation may happen when engine is running at low power and subsequently the compressor provides less purging air to the low pressure turbine while the low pressure turbine may still run at its maximum speed.

In order to reduce the gas ingestion of the hot gas flow path passing through the low pressure gas turbine to the wheel spaces, some solutions are available in the state of the art.

In particular, spacers may be added between wheels, these spacers may have rims that axially cover the space not covered by the wheels, these spacer rims may also radially extend to the same outer diameter of the wheels so to minimize the portion of the wheel rim above the wheel space cavity. Although the spacers realize a physical barrier against the hot gas ingestion, they are normally not in contact with the rims of the adjacent wheels and therefore hot gas may flow inside the gaps and reach the wheel spaces. The spacer may protect adjacent wheels even when wheels have a different outer diameter by shaping conical the spacer rim.

Accordingly, an improved turbine and blade capable of reducing any possible gas ingestion from the hot gas flow path would be welcomed in the technology.

SUMMARY

An improvements of the above mentioned spacers is the provision of a near seal flow path (NFPS), which are capable of pushing wheel space sealing near the hot gas path. The NFPSs have replaced the more traditional spacers, to better protect the wheel rims from hot gas ingestion that may take place not only inside the wheel cavities but also through the lab seal. Form a structural standpoint, the NFPS is a segment (i.e. arm members) and not a ring (as the spacers do), and therefore they introduce leak between adjacent rotor members. Besides they require a multi connection system, which necessarily increases the complexity of the solution, so as to have them engaged to internal supporting rotor wheels. The NFPS are indeed small components if compared to the traditional spacers and therefore may be made of more noble material.

However, recently, in order to increase the power and the efficiency of the gas turbines, the temperature of the hot gas flow path is increased. To this end, the purging air flow from the compressor is reduced, increasing the risk of gas ingestion from the hot gas flow path.

Also, when the low pressure turbine spins at a lower speed, the pressure undergoes proportionally to a reduced pressure variation, since the hot gas flow path has a lower expansion at lower velocity, passing from a stage to another or from a rotor assembly to another. At the same time, as said above, when the low pressure turbine spins at a lower speed the pumping effect is reduced.

Finally, the temperatures of wheel spaces are normally monitored by appropriate thermocouples. However, owing to the always more compact layout of the turbines, the installation of the thermocouples has become way more complicated, with subsequent lower reliability of the thermocouples. All the more reasons, the thermocouple installation is complicated when spacers or any other mechanical barrier is arranged between two rotor assemblies. Then, the number of installed thermocouples tends to be reduced, this causing a reduced control of the risk of temperature increase of wheel rims and their possible deterioration.

Accordingly, in one aspect, the subject matter disclosed herein is directed to a turbine comprising a plurality of rotor members, configured to rotate due to the expansion of hot burned gas flowing into a hot gas flow path channel. Each rotor member comprises a spacer placing between two facing rotor members. The spacer has the function to avoid an ingested gas flow from the hot gas flow path channel to reach the wheel space. Each rotor member comprises also a deflector, arranged close to a corresponding spacer, and configured to deflect the ingested gas flow over the upper surface of the spacer.

In another aspect, the subject matter disclosed herein regards that the deflector is arranged on the shank of each blade.

In another aspect, the subject matter disclosed herein concerns that the deflector is arranged on the rim of the rotor wheel of the blade and it can cover the gap between spacer and wheel.

In another aspect, disclosed herein is that the deflector has an upper surface, configured to deflect the possible gas ingestion from the hot gas flow path channel, toward the upper surface of the spacer. Also the deflector may have a lower surface, configured to allow the purging air coming from the wheel space passing through a gap between the between each spacer and the rotor member.

In another aspect, disclosed herein is a blade comprising a shank a root, coupled to the shank and an airfoil for rotating the rotor member, which comprises a deflector, configured to deflect the ingested gas flow.

BRIEF DESCRIPTION OF THE DRAWINGS

A more complete appreciation of the disclosed embodiments of the invention and many of the attendant advantages thereof will be readily obtained as the same becomes better understood by reference to the following detailed description when considered in connection with the accompanying drawings, wherein.

DETAILED DESCRIPTION OF EMBODIMENTS

Improvements to gas turbines have been discovered. Gas turbines have many parts, among them low pressure turbines. Such low pressure turbines are formed of many blades radiating from a central hub, and angled to move air through the engine. Some areas of the gas turbine are very hot. Others are cooler. A known problem is that part of the hot gas moved by the blades flows toward the central hub, thus causing damages and reducing the useful life of the turbines.

The inventors discovered that this problem may be alleviated and/or addressed by arranging a new deflector element in correspondence of the shank of each blade and interposed between the blade itself and a spacer, arranged between each blade. The deflector is shaped to deflect any possible gas ingestion from the hot gas flow path, toward the upper surface of the spacer. In this way, the deflector protects the turbine internal parts, preventing an average increase of the temperature therein.

Figure 1:
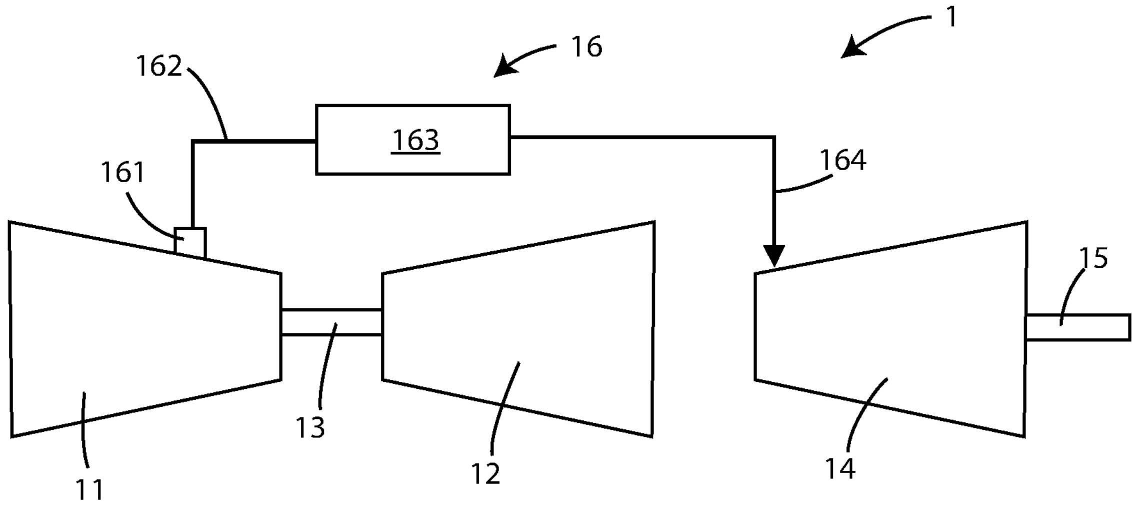
FIG. 1 illustrates a schematic of a gas turbine.

FIG. 1 illustrates schematically, a gas turbine, wholly indicated with the reference number 1. The gas turbine 1 includes, among other things: a compressor 11, to draw in compress a gas to be supplied to a combustor or burner (not shown in the figure) to add fuel to heat the compressed air, a high pressure turbine 12, comprising a plurality of rotor assemblies, to extract power from the hot gas flow path and drive the compressor 11, a shaft 13, connecting the compressor 11 and the high pressure turbine 12, and a low pressure turbine 14, also comprising a plurality of rotor assemblies, for driving, by a further shaft 15, for example, a gear box and a centrifugal compressor, or any other load.

In addition, the gas turbine 1 includes a purging system 16, to provide purging air to low the pressure turbine 14. The purging system generally comprises a bleed extraction 161, connected by a connection pipe 162 to a cooler 163, which, in its turn, is connected by a purging pipe 164 to the low pressure turbine 14, to cool the wheel spaces (see below) between the rotor assemblies. This has the effect and the function to reduce in part the overall temperature of the wheel spaces.

Figure 2:
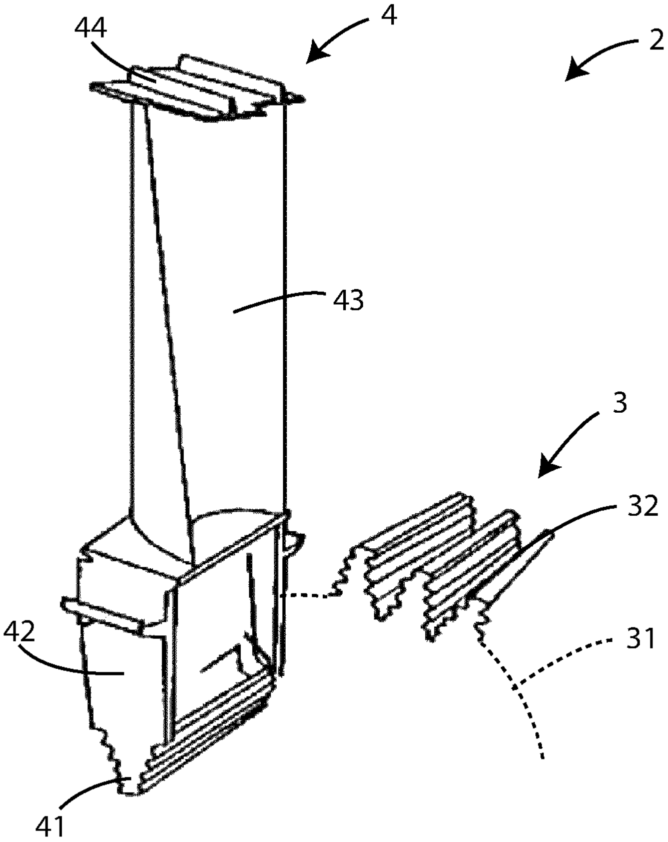
FIG. 2 illustrates an exploded view of a blade.
Figure 3:
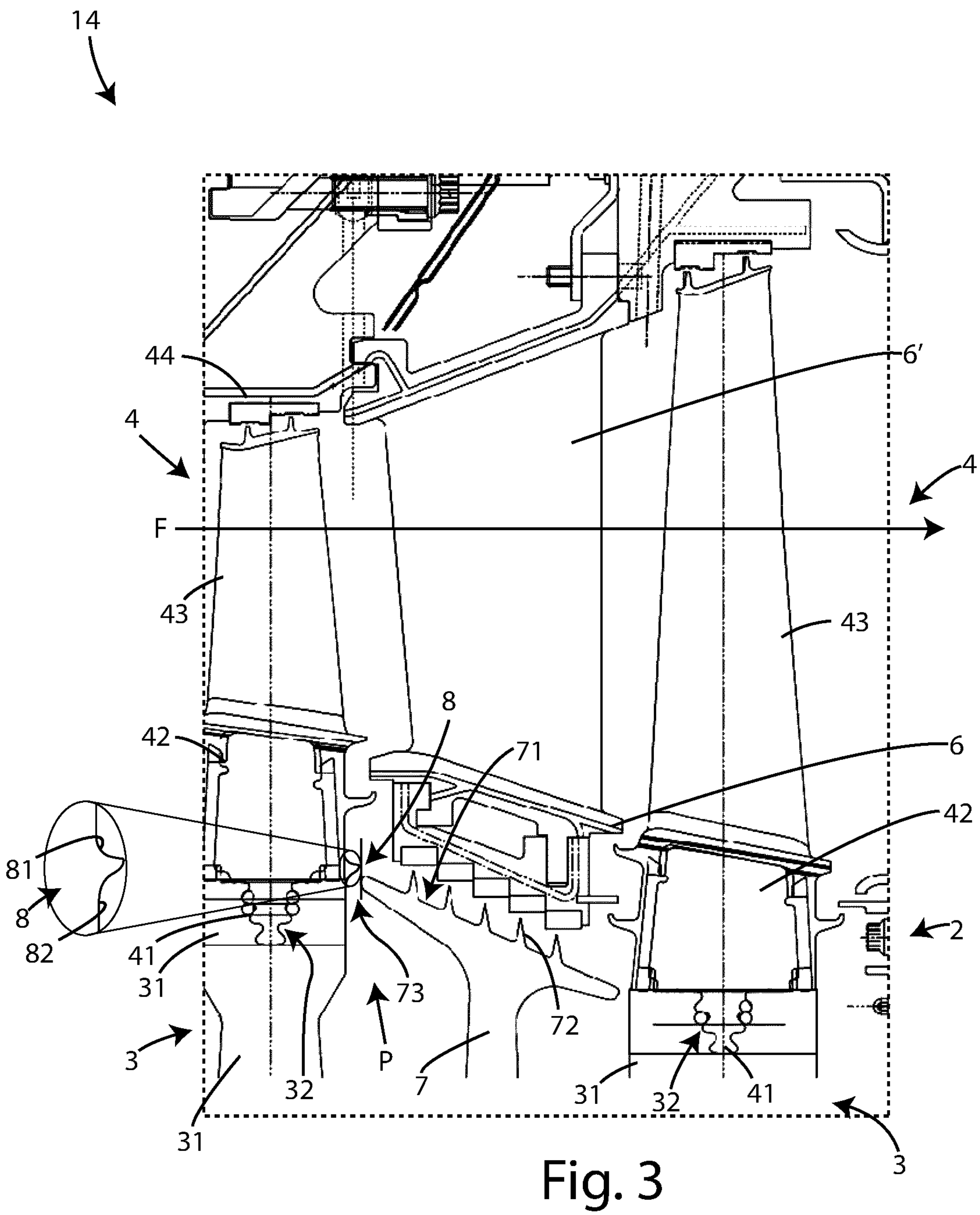
FIG. 3 illustrates a partial section of a low power turbine according to a first embodiment.

Referring also now to FIGS. 2 and 3, the low pressure turbine 14 usually comprises a plurality of rotor members, herein indicated with reference number 2, rotate around an axis of rotation R and are coupled with the shaft 15.

More specifically, each rotor member 2 comprises a rotor wheel 3, coupled to the shaft 15 and having a rim 31 and a plurality of circumferentially spaced female dovetail-shaped slots or grooves 32 about the rim 31. In the embodiment each groove 32 has a fit-three shape. However, in some embodiment the grooves can have a different shape.

Each rotor member 2 also comprises a plurality of blades 4, each one comprising, in its turn, a male-shaped dovetail or root 41, designed to fit with one corresponding groove 32 of the rotor wheel 31, along an insertion direction. Therefore, each roots 41 has almost the same shape of a corresponding groove 32.

The roots 41 of the blade 4 have only the mechanical function to firmly couple the blade 4 to the rotary wheel 3, and, in particular, to the grooves 32 of the rotor wheel 31.

Each blade 4 also comprise a platform or shank 42, which the root 41 is connected to, and an airfoil 43, coupled to the shank 42. The airfoil 43 is made of a noble material, since the airfoil 43 is subject to a remarkable thermal and mechanical stress. At the top of the airfoil 43 there is an airfoil shroud 44, for connecting each blade 4 to the neighboring ones, to prevent the blades 4 to bend while the turbine rotates because of the variable pressure field the airfoils 43 are subject to.

As said, between two adjacent and facing rotor wheels, a wheel space 5 is individuated and between two rotor wheels 3 of two rotor members 2.

FIG. 3 also illustrates a stator spacer 6 of the turbine 14 stator (not shown in the figures), interposed between two rotor member 2, and a nozzle 6'.

The hot gas flow path flows on a hot gas flow path channel, which is indicated with the arrow F, which of course passes through the airfoils 43 of the blades 4.

Between two adjacent blades 4 a spacer 7 is arranged, which has the function of realizing a barrier to prevent gas ingestion from the hot gas flow path channel F to the wheel space 5, which may cause an increase of temperature in the upper side of the wheel spaces 5, and consequently of the temperature of the roots 41 of the blades 4. As a said, in excess of thermal stress to the roots 41 is detrimental for their operation. In this embodiment, the spacer 7 is conical. However, in some embodiments the spacer 7 can be cylindrical or with others shapes, always with the function of defining and creating a protection for the wheel spaces 5. Also, on the upper surface 71 of each spacer 7, which faces the stator spacer 6, there is a labyrinth seal 72, for sowing the speed of the gas flowing between the spacer 7 and the stator spacer 6.

Still referring to FIG. 3, arrow P shows the purging air path, which comes from the purging system 16. The purging air has the function to reduce the temperature of the wheel spaces 5 as well as to create, with its pressure, a pressure barrier against the gas injection from the hot gas flow path channel F. The shank 42 of each blade 4 has a deflector 8, obtained on the shank 42 of each blade 4 and arranged in correspondence with the spacer 7, and particularly of its edge, so as to be arranged to cover a gap 73 between each spacer 7 and the rotor member 2, and in particular, with reference to the embodiment of FIG. 3, between the spacer 7 and the rim 31 of the rotor wheel 3.

In other words, in some embodiments, the deflector 8, which actually is ring-shaped, has the protruding edge faced in front of the edge of the spacer 7, so as to be in correspondence of the same, to close the gap between the spacer 7 and the rotor wheel 3. In fact, the spacer 7 is also ring-shaped, with an edge facing the rotary wheel 3. The surface of the deflector 8 is such that it can deflect hot gases as better explained below.

In the embodiment shown in FIG. 3, and in particular referring to the zoomed window shown in the same figure, the deflector 8 is shaped having a upper surface 81, intended to deflect the possible gas ingestion from the hot gas flow path channel F, toward the upper surface 71 and over the labyrinth seal 72 of the spacer 7, and a lower surface 82, this intended to allow the purging air coming from the wheel space 5 passing through the gap 73 between the between each spacer 7 and the rotor member 2.

In some embodiments the deflector 8 can be arranged in different positions and, more specifically, it may be obtained on the rotor wheel 3, almost in correspondence with the rim 31.

In general, it is required that the deflector 8 is able to deflect any possible gas ingestion from the hot gas flow path channel F that can overcome the mechanical barrier of the spacer 7 and whenever, for instance, the purging air pressure P from the wheel spacer 5 is not enough for preventing that in general the hot gas to enter the wheel spaces 5.

The low pressure turbine 14 and the deflector 8 operate as follows.

When the low pressure turbine 14 operates and the rotor members 2 rotates, the purging air P coming from the compressor 163 and conveyed by the purging pipe 164, cools the wheel spaces 5. At the same time, the combined effect of the pumping effect, due to the spinning velocity of the low pressure turbine 14, namely of the rotor members 2, along with the barrier realized by the spacer 7, prevents the gas ingestion from the hot gas flow path channel F into the wheel spaces 5. Also, any possible gas ingestion, even local, is further prevented by the action of the deflector 8, which, on the one hand, being it arranged in correspondence with the spacer 7, it does deflect possible local gas ingestions from the hot gas flow path channel F by the first surface 81, and on the other hand, it also allows the purging air P to pass through the gap 73. Local gas ingestion can take place owing also to the fact that the pressure field caused by the hot gas flow in the hot gas flow path channel F is not always constant. With reference to the deflector 8, being arranged in correspondence with the spacer 7 means in some embodiments that it is capable of deflecting the hot gases toward the upper surface of the spacer 7.

The operation of the deflector has a particular impact in case the spinning velocity of the low pressure gas turbine 14 is reduced, for instance, when a low pressure gas turbine 14 operates at 50% of its nominal operational speed. In this case the protective action of the pumping effect is reduced proportionally to the velocity reduction.

Figure 4:
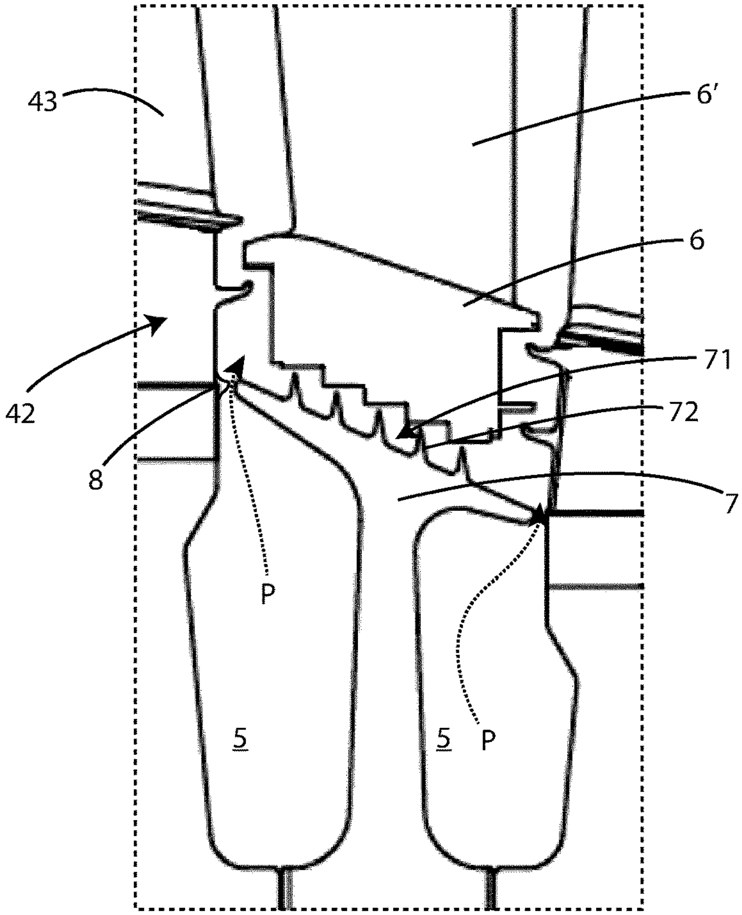
FIG. 4 illustrates a section of a low power turbine section according to a first embodiment, where the purging air flow in normal operating conditions is shown.
Figure 5:
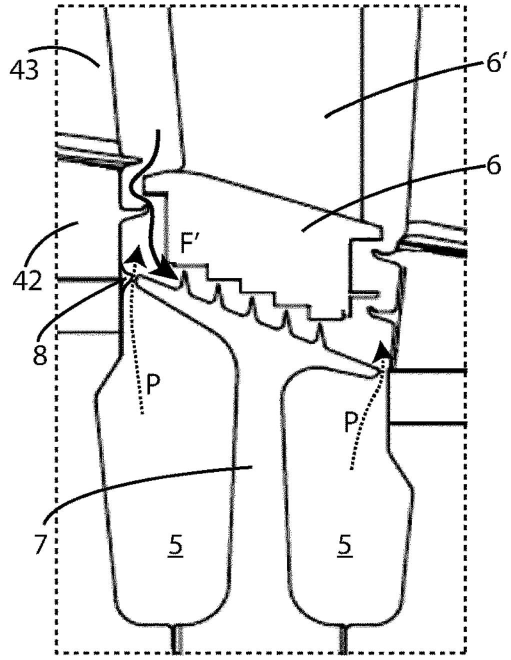
FIG. 5 illustrates the section of the low power turbine of FIG. 4, where a low gas ingestion is shown.
Figure 6:
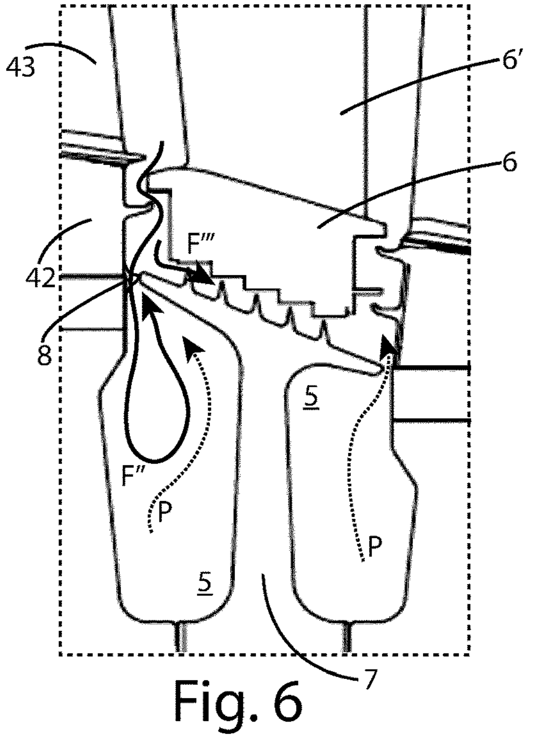
FIG. 6 illustrates the section of the low power turbine of FIG. 4, where a high gas ingestion is shown.

In particular, in order to better describe the operation of the deflector 8, FIGS. 4, 5 and 6 illustrate some operating conditions of the low pressure turbine 14. In FIG. 4 a typical flow path of the purging air P is seen, where no gas ingestion is foreseen. In this case, the purging air P coming from the compressor 11 passes through the wheel spaces 5 and reaches the hot gas flow path channel F, protecting the wheel spaces 5 from the high temperature of the hot gases.

Referring now to FIG. 5, it is illustrated a low gas ingestion phenomenon, where part (see arrow F') of the hot gas of the hot gas flow path channel F reaches the spacer 7, and in particular the upper surface 71 and the labyrinth seal 72 also thank to the deflector 8. In this case, the gas ingestion in the wheel spaces 5 is at least in part prevented either by the deflector 8 as well as by the purging air P coming from the compressor 163, which is allowed to contrast the ingested gas F' from the hot hair flow path F by the shape of the lower surface 82 of the deflector 8. The hot gas reaches the shank 42, raising its temperature, thus causing a potential risk for the roots 41 of the blades 4. The deflector 8 aids to prevent that possibly the hot ingested gas F' coming from the hot gas flow of the hot gas flow path channel F can leak in the wheel spacers 5, so warming the shank 42.

In FIG. 6 is shown the case of high gas ingestion phenomenon in case for instance of low speed of the low pressure turbine. In particular, there are shown a first arrow F", which represents the hot gas of the hot gas flow path channel F ingested in case of the blade 4 is not equipped with the deflector 8, where it's clear that the hot gas reaches the wheel spaces 5 and heats up the shank 42, and consequently the root 41 of the blade 4, causing its damage; and a second arrow F'", which represents the hot gas of the hot gas flow path channel F ingested in case of the blade 4 is equipped with the deflector 8. It's easily appreciated that in this latter case, the hot gas is deflected and prevented to reach the wheel spaces 5.

In the operating condition mentioned above, where, as said, the low pressure turbine 14 is operating at low speed, the purging air P coming from the wheel spaces 5 is not enough for contrasting the ingested gas F'", and so the deflector 8 deflects the ingested gas flow F'" toward the upper surface 71 of the spacer 7 and the labyrinth seal 72. The upper surface 81 of the deflector 8 from one side obstructs the ingested gas F'" to reach the wheel spaces 5, and, from the other side, deflects, as said above, the hot gas over the spacer 7 away from the shank 42, thus allowing a reduction of the temperature of the shank 42 itself, and, consequently, of the root 41 of the blade 4.

Figure 7:
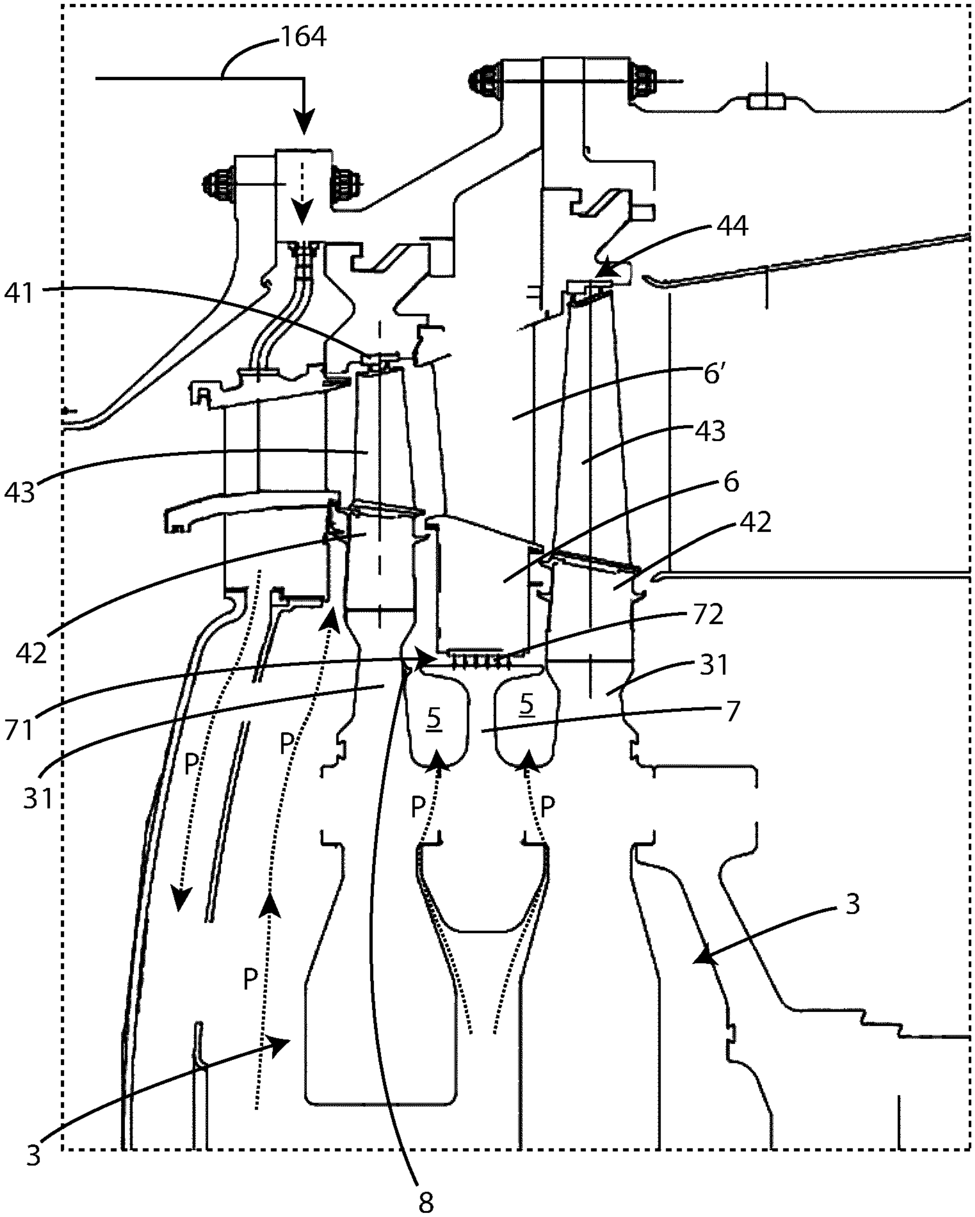
FIG. 7 illustrates a partial section of a low power turbine according to a second embodiment.

Referring to FIG. 7 a second embodiment of an improved low pressure turbine 14 is shown. In the mentioned figure the same reference numbers designate the same or corresponding parts, elements or components already illustrated in FIG. 3 and described above, and which will not be described again. In this case, however, the spacer 7 is not conical but cylindrical. Also in this case, the deflector 8 is placed on the shank 7 or on the rim 31 of the rotor wheel 3, in correspondence of the spacer 7.

FIG. 7 illustrates also several paths of the purging air P coming from the compressor 11 through the purging pipe 164.

The operation of the low power turbine 14 in this case is the same of that disclosed in the previous figure.

While the invention has been described in terms of various specific embodiments, it will be apparent to those of ordinary skill in the art that many modifications, changes, and omissions are possible without departing form the spirt and scope of the claims. In addition, unless specified otherwise herein, the order or sequence of any process or method steps may be varied or re-sequenced according to alternative embodiments.

Reference has been made in detail to embodiments of the disclosure, one or more examples of which are illustrated in the drawings. Each example is provided by way of explanation of the disclosure, not limitation of the disclosure. In fact, it will be apparent to those skilled in the art that various modifications and variations can be made in the present disclosure without departing from the scope or spirit of the disclosure. Reference throughout the specification to "one embodiment" or "an embodiment" or "some embodiments" means that the particular feature, structure or characteristic described in connection with an embodiment is included in at least one embodiment of the subject matter disclosed. Thus, the appearance of the phrase "in one embodiment" or "in an embodiment" or "in some embodiments" in various places throughout the specification is not necessarily referring to the same embodiment(s). Further, the particular features, structures or characteristics may be combined in any suitable manner in one or more embodiments.

When elements of various embodiments are introduced, the articles "a", "an", "the", and "said" are intended to mean that there are one or more of the elements. The terms "comprising", "including", and "having" are intended to be inclusive and mean that there may be additional elements other than the listed elements.

The invention claimed is:

1. A turbine, comprising:

a downstream rotor member and an upstream rotor member, both configured to rotate due to expansion of hot burned gas flowing into a hot gas flow path channel, a spacer arranged between the downstream rotor member and the upstream rotor member, the spacer configured to avoid an ingested gas flow from the hot gas flow path channel to reach a wheel space found between the downstream rotor member and the upstream rotor member, wherein the spacer is arranged at a downward angle towards a rotation axis from the upstream rotor member to the downstream rotor member;

a deflector disposed on the upstream rotor member, the deflector having a lower surface spaced apart from the spacer and an upper surface configured to deflect the ingested gas flow over the upper surface of the spacer; and a purging system fluidly coupled to the wheel space, the purging system configured to provide purging air into the wheel space, wherein space between the lower surface of the deflector and the spacer is configured to allow purging air to flow out of the wheel space.

2. The turbine of claim 1, wherein the spacer is arranged at an angle between the upstream rotor member and the downstream rotor member.

3. The turbine according to claim 1, wherein the downstream rotor member and the upstream rotor member comprise:

a rotor wheel configured to rotate around the rotation axis, the rotor wheel having an outer rim, and wherein the deflector is arranged on the rim of the rotor wheel.

4. The turbine according to claim 3, wherein the deflector covers a gap between the spacer and the rotor wheel.

5. The turbine of claim 1, wherein the upstream rotor member and the downstream rotor member comprise:

a rotor wheel configured to rotate around the rotation axis, the rotor wheel having an outer rim with circumferentially-spaced grooves; and blades disposed at the circumferentially-spaced grooves, each blade comprises a shank, a root coupled to the shank and having a shape that fits with one of the circumferentially-spaced grooves of the rotor wheel, and an airfoil for rotating the rotor member by intercepting the hot gas flow path, and wherein the deflector is arranged on the shank.

6. The turbine of claim 5, wherein the deflector is integral with the shank.

7. The turbine according to claim 1, wherein the spacer has an upper surface facing the hot gas ingestion.

8. The turbine according to claim, wherein the wheel space is defined between two adjacent rotor wheels, wherein purging air passes through the wheel spacer to reach the hot gas flow path channel.

9. The turbine according to claim 1, wherein said turbine is a low pressure turbine.

10. The blade according to claim 1, wherein the deflector has an upper surface that is configured to deflect the possible gas ingestion from the hot gas flow path toward the upper surface of the spacer.

11. A turbine, comprising:

a blade comprising, a shank;

a root coupled to the shank;

an airfoil configured for intercepting a hot gas flow, and a deflector configured to deflect the hot gas flow;

a spacer having a first end and a second end, the first end in proximity to and spaced below the deflector to form a gap, the spacer angling downwardly towards a rotation axis so as to arrange the second end below the first end; and a purging system, wherein purging air from the purging system flows from below the deflector through the gap.

12. The blade of claim 11, wherein the root is designed to fit with a groove of the rotor wheel.

13. A turbine, comprising:

a flow path channel;

blades disposed in the flow path channel and configured to rotate about a rotation axis, the blades arranged as an upstream blade and a downstream blade;

a hot gas deflector disposed between the upstream blade and the downstream blade, the hot gas deflector comprising:

a spacer, wherein the spacer is arranged at a downward angle towards the rotation axis from the upstream blade to the downstream blade; and a deflector formed integrally on the upstream blade; and a purging system, wherein purging air from the purging system can flow in proximity to the upstream blade and through space between the deflector and the spacer.

14. The turbine of claim 13, wherein the spacer has a first end and a second end, and wherein the second end is closer to the rotation axis than the first end.

15. The turbine of claim 13, wherein the spacer has a first end and a second end, wherein the first end is proximate the deflector, and wherein the second end is closer to the rotation axis than the first end.

16. The turbine of claim 13, wherein the spacer has an angled upper surface that forms a labyrinth seal.

17. The turbine of claim 13, wherein the spacer has an upper surface that angles downwardly toward the rotation axis from the upstream blade to the downstream blade, and wherein the upper surface forms a labyrinth seal.

18. The turbine of claim 13, wherein the purging system introduces purging air below the spacer.

* * * * *